R. J. DEARBORN.
ELECTRIC CIRCUIT CONTROL SYSTEM.
APPLICATION FILED FEB. 20, 1906.
1,112,439.
Patented Oct. 6, 1914.
2 SHEETS—SHEET 2.
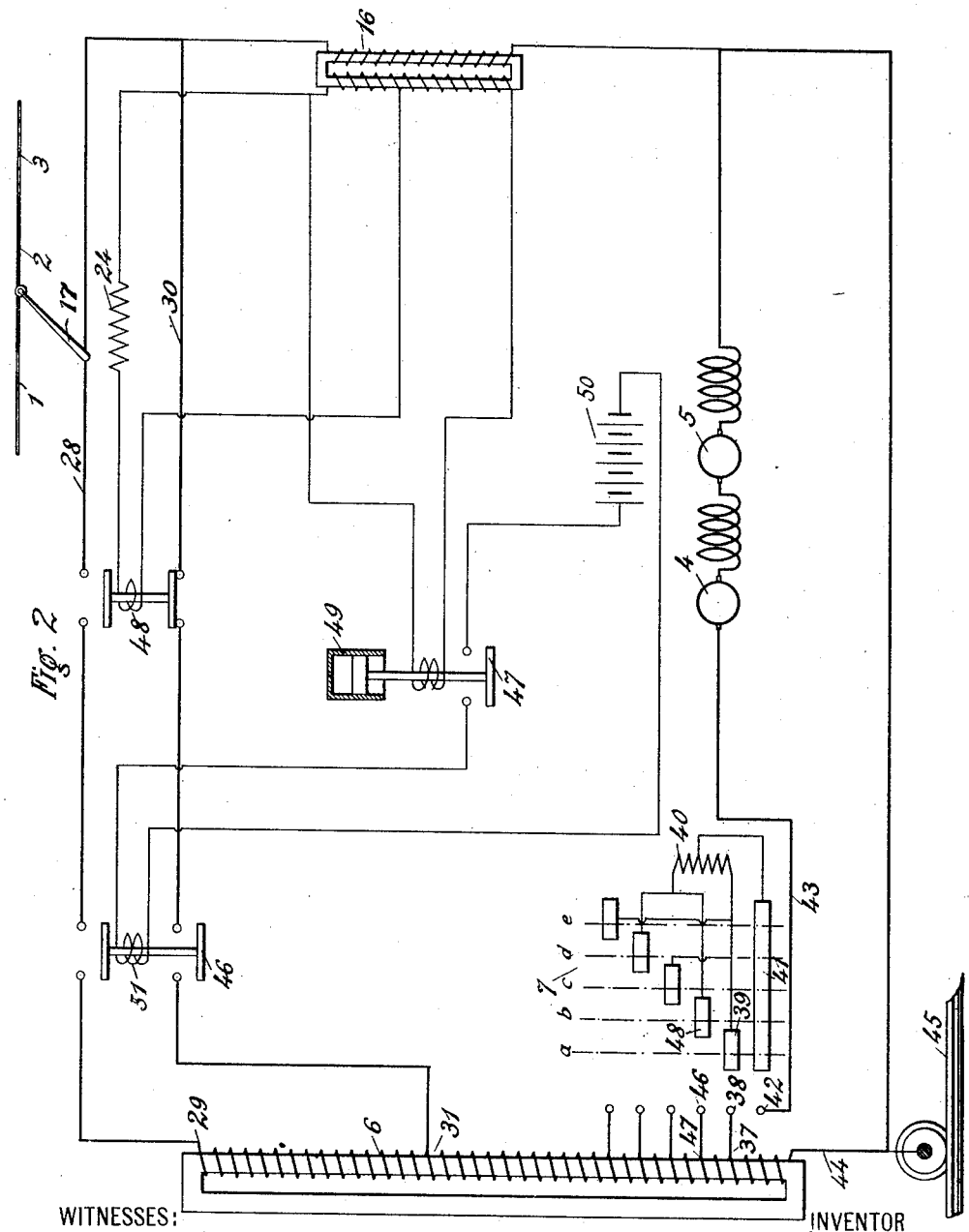
WITNESSES:
Camille Boulin
Otto J. Schairer
INVENTOR
Richard J. Dearborn
BY
Keeley G. Carr
ATTORNEY

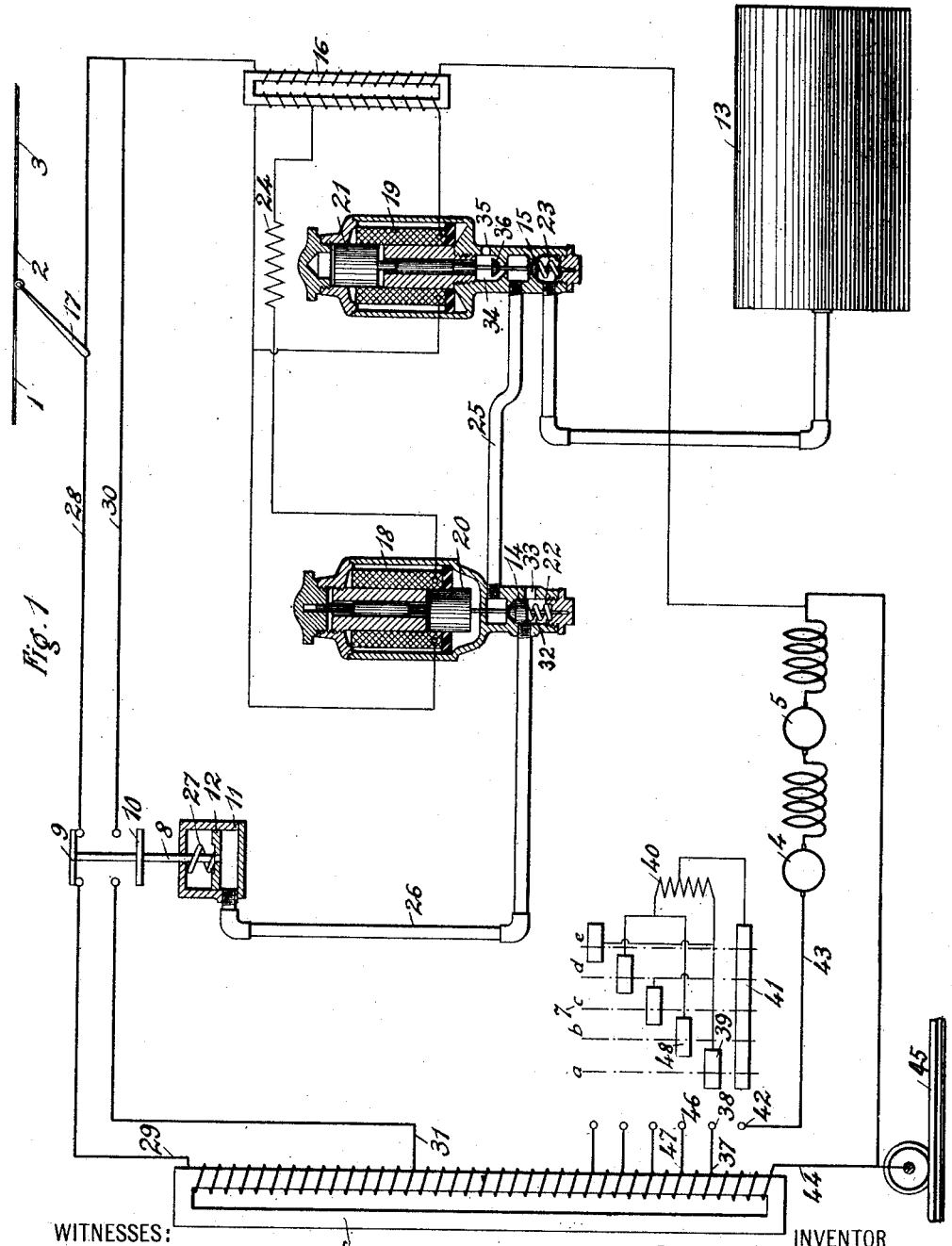

# UNITED STATES PATENT OFFICE.

RICHARD J. DEARBORN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC-CIRCUIT-CONTROL SYSTEM.

1,112,439.

Specification of Letters Patent.

Patented Oct. 6, 1914.

Application filed February 20, 1906. Serial No. 302,137.

*To all whom it may concern:*

Be it known that I, RICHARD J. DEARBORN, a citizen of the United States, and a resident of Wilkinsburg, in the county of Allegheny and State of Pennsylvania, have invented a new and useful Improvement in Electric-Circuit-Control Systems, of which the following is a specification.

My invention relates to control systems for electrical apparatus and has special reference to systems which are adapted for the control of electric vehicle motors and which are energized from sources of alternating electric current.

The object of my invention is to provide, in a system of the aforesaid class, a simple and effective means for automatically selecting a predetermined supply circuit and for completing suitable connections between a single contact device and the system that shall be dependent upon the electromotive force supplied to the contact device.

When electric vehicles are supplied with alternating current energy, it is often desirable to arrange the motor-control system for operation on more than one potential. For example, it has been found both economical and advantageous to employ a relatively high trolley voltage in sparcely settled districts, while relatively low voltages are generally used within the limits of large towns and cities, on account of the dangers incident to the use of high voltages in such places. The voltage which is applied to the vehicle motors must, of course, be substantially the same in both cases but, as this voltage is usually lower than the trolley voltage, the reduction being effected by a transformer carried on the vehicle, it is comparatively easy to design the transformer for the highest voltage which will be supplied from the trolley conductor and to apply the voltage from the city line to an intermediate tap in its winding. This change in circuit connections has been effected, in the prior art, by a manually operated, selective switch, which necessitated stopping the vehicle and, although little danger would occur to the equipment if the vehicle were running from the higher to the lower voltage, disastrous results might occur if the operator failed to change the position of the selective switch in going from the lower to the higher voltage.

In order to effect the change in the circuit connections from one transformer supply tap to another, without stopping the vehicle or placing the equipment in danger of injury, I have provided a device which automatically selects the proper transformer lead and completes the circuit connection from the trolley to this point.

In the accompanying drawings Figure 1 is a diagrammatic view of a system, embodying my invention, in which a pneumatically-operated switching device is employed and Fig. 2 is a similar view of a system in which an electrically-operated switching device is employed.

Referring to Fig. 1, alternating current electrical energy is supplied from a supply line conductor which is divided into sections 1 and 3 by an insulating section 2, to a plurality of electric motors 4 and 5 through a voltage-regulating transformer 6, the connection between the motors and transformer being determined by a controller 7 and the connections between the conductors 1 and 3 and the transformer 6 being determined by a pneumatically-operated, selective device 8. The selective device 8 comprises a pair of similar bridging contact members 9 and 10 which are located in the transformer supply circuits, a fluid-pressure cylinder 11, and a piston 12 which is mechanically connected to said bridging contact members. The cylinder 11 is supplied with fluid-pressure from a storage tank 13, the fluid admission being controlled by a plurality of valves 14 and 15 which are respectively governed by the windings 18 and 19 that receive energy from a relatively small transformer 16. The transformer 16 is connected across the supply circuit at all times so that it is directly affected by changes in its potential. The storage tank 13 may also be utilized for other purposes in the operation and control of the vehicle, if desired. The main transformer 6 is connected at two points in its winding with a trolley or other suitable contact device 17 which is adapted to engage the sections 1 and 3 of the supply conductor and also the intermediate insulating or dead section 2. The windings 18 and 19 are provided, respectively, with core members or armatures 20 and 21 which are mechanically connected to the valves 14 and 15. The valves are normally held closed by springs 22 and 23 which slightly overbalance the weights of the moving parts when no fluid-pressure is applied to the valve 14 and when the windings are deënergized. The winding 18 is connected in series with a suitable resistance 24 and relatively few secondary turns of the winding of the transformer 16 so that it receives sufficient current to energize it only when a relatively high voltage is applied to the primary winding of the transformer. The magnet winding 19 is, however, connected in series circuit with a relatively large number of turns of the secondary winding of the transformer 16 so that it is energized when either a high or a relatively low voltage is applied to the primary of the transformer. The core member 20 is so arranged that the winding 18, when energized, holds the valve 14 closed, while the movable core member 21 is so arranged that it is operated by the magnet winding 19, when energized, to open the valve 15. In this way, when the transformer 16 is energized from a relatively low voltage, the magnet 19 is energized and opens the valve 15 to admit fluid-pressure from the storage tank 13 to a pipe 25 which connects the chambers above the valves 14 and 15, and, since the magnet winding 18 is not energized, valve 14 is opened by reason of the fluid-pressure and fluid is admitted to the cylinder 11 which is connected therewith by a pipe 26. On the other hand, when a relatively high voltage is impressed upon the transformer 16 both magnet windings 18 and 19 are energized, whereby valve 14 is closed and valve 15 is opened. As soon as the latter valve is opened, fluid passes from the tank 13 into pipe 25 but, since the pressure is not sufficient to open the valve 14 when the magnet winding 18 is energized, no fluid-pressure is supplied to the cylinder 11. The bridging contact members 9 and 10 of the selective device 8 are so connected together that both of the circuits in which they are located may not be simultaneously closed, and a spring 27 is interposed between one end of the cylinder 11 and the piston 12 to oppose the fluid-pressure in the cylinder and thus actuate the member 9 to complete a circuit 28 from the trolley 17 to one terminal 29 of the transformer 6. When sufficient fluid-pressure is admitted to the cylinder 11 to overcome the force exerted by the spring 27, the circuit 28 is opened and the bridging contact member 10 closes a circuit 30 from the trolley 17 to an intermediate tap 31 in the transformer 6. The chamber 32 for the valve 14 is provided with a port 33 which permits the pressure to exhaust from the cylinder 11 when the valve is closed, and adjacent to the valve 15 is an auxiliary exhaust chamber 34 having an outlet port 35 and a valve 36 which allows fluid to escape from the pipe 25 when the valve 15 is closed and which is closed when the valve 15 is open.

In order to illustrate the action of the system, a special case may be assumed as follows: Assume that alternating current, electrical energy is supplied to conductor sections 1 at 3,300 volts while energy is similarly supplied to conductor sections 3 at 550 volts and that the trolley 17 is disengaged from both sections. In this case, no energy is supplied to the transformer 16 and circuit 28 is completed, since the spring 27 holds the bridging contact member 9 in its closed circuit position and the valve 15 is closed by the action of the spring 23 and also by the fluid-pressure in the storage tank 13, which must be overcome by the action of the magnet winding 19 in order to open the valve. If the trolley 17 is now moved into engagement with conductor section 1, energy is supplied at 3,300 volts to the transformer 16 and energizes both magnet windings 18 and 19, as hereinbefore explained, so that the valve 14 is held closed and the valve 15 is opened. When the valves occupy these positions, no fluid-pressure is admitted to the cylinder 11 and the circuit 28 remains closed, while the circuit 30 remains open. In this way, energy is supplied to the transformer 6 through the terminal 29, which is designed to receive the higher voltage of the line at this point. If the controller 7 is now moved to occupy the position a, energy is supplied from the transformer 6 through a transformer tap 37, contact finger 38, ring segment 39, inductive resistance 40, ring segment 41, contact finger 42, and conductor 43 to one terminal of one of the motors 4 and 5, which are connected in series relation, the opposite terminal of the other motor being connected to terminal 44 of the transformer 6 and to a line conductor 45 which is connected to the opposite terminal of the source which supplies energy to the conductor sections 1 and 3. As the controller 7 is moved from the position a to the position b, a contact finger 46, which is connected to a transformer tap 47, engages a ring segment 48 before the contact finger 38 is disengaged from the ring segment 39. Energy is supplied from this tap through one-half of the inductive resistance 40 in opposition to the current supplied from the tap 37, and when the controller 7 occupies the position b the finger 38 is disengaged from the ring segment 39 and energy is supplied to the motors only from the tap 47 which is arranged to deliver somewhat higher potential than the tap 37. In this way, the voltage applied to the motors may be increased without interrupting the supply of energy and without short-circuiting the transformer turns included between two adjacent taps since the inductive resistance 40 is always included in the circuit which is completed from one tap to the next. The electromotive force applied to the motors may be similarly increased as the controller 7 successively occupies positions c, d and e and, since the action of said controllers is well known in the art and forms no part of my present invention, I deem it unnecessary to further describe the circuit arrangement for the several controller positions. The transformer taps 29 and 31 are so arranged in relation to the voltages supplied from the conducting sections 1 and 3 that the voltages applied from the several taps which are connected to the fingers of controller 7 are substantially the same whether the voltage of section 1 is applied to the transformer terminal 29 or the voltage of section 3 is applied to the transformer tap 31.

Referring to Fig. 2 the motors 4 and 5 are similarly controlled and supplied with energy at various voltages from the transformer 6, and the transformer 16 is similarly connected across the line, but, in place of the valve magnets 18 and 19 which control the fluid-pressure system of Fig. 1, an electrically operated interrupter switch 46, a relay switch 47 and an electrically-operated, selective device 48, which corresponds to the device 8, are employed. In this case, the circuit interrupter 46 is arranged to open both circuit 28 and circuit 30, through which energy is supplied to the transformer, as soon as the contact device 17 is disconnected from either a high or low voltage supply conductor and the selective device 48 normally occupies a position in which current is applied through conductor 30 to the circuit interrupter 46 and this position is still occupied if the contact device receives energy at the lower voltage, a suitable resistance 24 being connected in series therewith. On the other hand, the winding of the relay switch 47 corresponds to the winding of the valve magnet 19 of Fig. 1 that is energized whenever energy is supplied to the contact device 17. The relay switch 47 acts in opposition to a dash pot 49 or other means for retarding its closure and when it has been finally closed, current is supplied from any convenient source, such as a battery 50, through the actuating magnet 51 of the main circuit-breaker 46, which is immediately closed. The dash pot 49 introduces a time element in the closure of the switch 47 in order that the selective device 48 may be actuated—if it is actuated at all—before the circuit-breaker is closed. Accordingly, if the contact device 17 receives the lower voltage, the selective device 48 remains in its normal open circuit position and the circuit-breaker 46 is closed, whereupon circuit is completed through conductor 30, the selective device and the circuit-interrupter to the intermediate tap 31 of the transformer 6. If energy is supplied to the contact device at the higher voltage, the selective device 48 immediately changes position and, when the circuit-interrupter 46 is again closed, circuit is completed through conductor 28, selective switch 48 and circuit-interrupter 46 to the terminal 29 of the transformer 6.

It will be observed that, in the system illustrated in Fig. 1, the possibility of supplying the higher voltage to the low-voltage tap of the transformer 6 is very remote, since any failure in operation which might occur would tend to leave the selective device 8 in position to supply energy to the terminal 29.

I claim as my invention:

1. The combination with sources of electrical energy of unlike voltage, a plurality of conductor sections severally supplied therefrom, electrical apparatus adapted to be connected to the one or the other of said sections and a pair of switches for effecting such connection, of means for automatically and selectively actuating the switches to complete the one or the other of said connections according as the voltage of the conductor section from which energy is received is high or low.

2. An electrically propelled vehicle having a current collector adapted to engage either a high or a low voltage supply circuit conductor, high and low voltage receiving conductors and automatic means for selectively connecting the current collector to the one or the other of the receiving conductors, in accordance with the voltage of the supply circuit conductor that is engaged by the current collector.

3. The combination with an alternating current supply conductor, a transformer having two points adapted to be connected to said conductor, and a switching device for effecting such connections, of means for automatically and selectively actuating said device to complete a connection from said supply conductor to the one or the other point in said transformer according as the supply conductor is at a relatively high or low potential.

4. The combination with a supply conductor, a plurality of electric motors, a voltage-regulating transformer provided with a plurality of leads adapted to be connected to said supply conductor, and a switching device for effecting such connections, of means for automatically and selectively actuating said device to complete a connection from the supply conductor to the one or the other of said transformer leads according as the energy supplied is at a relatively high or low voltage.

5. The combination with a pair of supply conductors of unlike voltage, electrical apparatus adapted to be connected to the one or the other of said conductors, and a pair of mechanically interlocked switches for effecting such connections one of which is normally closed and the other normally open, of means for simultaneously actuating said switches to successively open the one and close the other only when energizing current for said actuating means is supplied at a relatively low voltage.

6. The combination with a supply conductor, electrical apparatus adapted to be connected thereto, and a pair of switches for effecting such connections, of means dependent upon the voltage at which the current is supplied for automatically and selectively actuating said switches, said means comprising a fluid-pressure cylinder, a piston therefor having a rod attached to said switches, and a plurality of electrically actuated valves to control the fluid-pressure in said cylinder.

7. The combination with a supply conductor, a transformer having two points adapted to be connected thereto, and a switching device comprising a pair of switching contact members, an actuating rod by which said contacts are mechanically connected, a piston attached to one extremity of said rod, and a fluid-pressure cylinder in which said piston is adapted to be operated, of means dependent upon the voltage at which the current is supplied for automatically and selectively actuating said switches.

8. The combination with a supply conductor, a transformer having two points adapted to be connected thereto, and a switching device comprising a pair of switching contact members, an actuating rod by which said contacts are mechanically connected, a piston attached to one extremity of said rod, and a fluid-pressure cylinder in which said piston is adapted to be operated, of means dependent upon the voltage at which the current is supplied for automatically and selectively actuating said switches, said means comprising a fluid-pressure storage tank connected to said cylinder, a pair of electrically controlled valves inserted in the fluid conduit between the tank and the cylinder, and an auxiliary transformer connected to said supply conductor and from which energy is supplied to the actuating magnets of said electrically controlled valves.

9. The combination with a supply conductor, and a transformer having a plurality of taps adapted to be connected thereto, of means for automatically selecting a suitable transformer tap and connecting it to said supply conductor according as the voltage applied to the supply conductor is relatively high or low.

10. In a control system for electric motors, the combination with a supply conductor, and a voltage-regulating transformer having a plurality of different-voltage taps adapted to be connected to said supply conductor, of voltage-responsive means for automatically selecting a predetermined tap in accordance with the voltage of the supply conductor.

11. The combination with a supply conductor, a plurality of motors, a voltage-regulating transformer therefor having a plurality of taps, and a controlling means for determining the connections between the motors and the transformer, of means for completing circuit connections between the supply conductor and any one of said taps, according to the voltage supplied by said conductor.

12. In an electric railway system, the combination with two sources of electric energy of unlike voltages and supply conductors severally connected thereto, of a translating device, switching devices for making and breaking circuit connections between said translating device and said supply conductors and means for automatically and selectively actuating said switching devices to complete the one or the other of said connections according as the voltage of the supply conductor in service is high or low.

13. The combination with sources of electrical energy of different potentials, supply conductors severally connected thereto and a translating device having high and low-voltage terminals, of automatic means for selectively making circuit connections from the supply conductor in service to either the one or the other of said terminals according as the voltage of the supply conductor in service is high or low.

14. The combination with sources of electrical energy of different potentials, supply conductors severally connected thereto, a motor and an intermediate voltage-transforming device, of switches for connecting the said device to the respective supply conductors, and voltage-responsive, selective means for automatically controlling the operation of said switches in accordance with the supply conductor in service.

15. The combination with a high-voltage source and a low-voltage source of electric energy, and electric apparatus having terminals respectively adapted to receive energy from the said sources, of means dependent upon voltage conditions for automatically and selectively making a connection to the one or the other of the terminals.

In testimony whereof, I have hereunto subscribed my name this 16th day of February, 1906.

RICHARD J. DEARBORN.

Witnesses:
OTTO S. SCHAIRER,
BIRNEY HINES.

Copies of this patent may be obtained for five cents each, by addressing the "Commissioner of Patents, Washington, D. C."